United States Patent [19]
Jachowski

[11] Patent Number: 5,446,729
[45] Date of Patent: Aug. 29, 1995

[54] COMPACT, LOW-INTERMODULATION MULTIPLEXER EMPLOYING INTERDIGITAL FILTERS

[75] Inventor: Douglas R. Jachowski, Reno, Nev.

[73] Assignee: Allen Telecom Group, Inc., Solon, Ohio

[21] Appl. No.: 146,716

[22] Filed: Nov. 1, 1993

[51] Int. Cl.$^6$ ............................................. H04J 1/08
[52] U.S. Cl. ...................................... 370/37; 370/38; 333/1
[58] Field of Search ............... 370/37, 38; 333/1, 110, 333/126, 127, 128, 129, 202, 203, 204, 205, 219, 223, 224, 225, 231, 232, 235, 246; 455/78, 80, 81, 82

[56] References Cited

U.S. PATENT DOCUMENTS

| | | | |
|---|---|---|---|
| 3,597,709 | 8/1971 | Rhodes | 333/203 |
| 3,818,389 | 6/1974 | Fisher | 333/203 |
| 4,450,421 | 5/1984 | Meguro et al. | 333/202 |
| 4,596,969 | 6/1986 | Jachowski | 333/203 |
| 4,660,004 | 4/1987 | Jachowski | 333/134 |

*Primary Examiner*—Wellington Chin
*Attorney, Agent, or Firm*—Laff, Whitesel, Conte & Saret, Ltd.

[57] ABSTRACT

An improved multiplexer comprises a housing, a transmission line transformer section within the housing extending in a first direction, and at least two interdigital transmission line filters adjacently disposed within the housing along the first direction. The transformer section has a first end electrically coupled to an antenna circuit connector, and a second end electrically coupled to the housing (i.e. grounded). Each filter includes several resonating elements. At least one resonating element of each filter is located in proximity with a portion of the transformer such that electrical coupling between the filter and the transformer is established. The length of each coupling portion of the transformer is approximately one-quarter electrical wavelength at the center frequency of the associated filter. The dimensions of the filter cavities are preferably selected to be as small as possible without unacceptably degrading the filter insertion loss. Further, the filters, and the associated coupling portions of the transformer, are disposed in close proximity. The filter cavity size and spacing are such that the transformer coupling portions of adjacent filters are no more than about one-eighth wavelength apart (measured along the first direction). This provides a significant reduction in the physical volume required for prior art multiplexers employing interdigital filters. An adjustable-frequency resonating element formed as a longitudinally extending body portion having an deformable leaf adjustment member at one end. Deformation of the adjustment member modifies the effective electrical length, and thereby, the resonant frequency, of the resonator.

13 Claims, 11 Drawing Sheets

COMPACT, LOW-INTERMODULATION MULTIPLEXER EMPLOYING INTERDIGITAL FILTERS

BACKGROUND OF THE INVENTION

This invention relates to antenna circuit multiplexers for connecting a single antenna to several radio-frequency transmitting or receiving devices, and more particularly to radio frequency multiplexers constructed from a plurality of adjacent transmission line filters.

In radio communications systems, it is often desirable to operate transmitter and receiver devices simultaneously, in the same general location, and at frequencies relatively close to one another. In addition, it is often desirable to connect the transmitter and receiver devices to the same antenna.

For example, certain types of mobile radio systems include "repeaters," which receive a signal on a first frequency and simultaneously retransmit the signal on a second frequency for reception over a wide geographical area. Typically, the first and second frequencies may differ by 500 KHz to 30 MHz, depending on the application. Similarly, in cellular telephone systems and many other radio-based telephone systems, full duplex operation is required, so that both the subscriber equipment and the base station equipment must transmit and receive simultaneously on frequencies about 30 MHz apart.

In such applications, it is essential to prohibit significant amounts of the transmitted RF signal reaching the receiver equipment. At best, substantial signal levels at the transmitter frequency will degrade receiver performance by overloading the front end or intermediate frequency stages of the receiver, and at worst, such signals could damage the receiver equipment. At the same time, it is essential to permit signals captured by the antenna at the desired receive frequencies to reach the receiver equipment.

Accordingly, a variety of multiplexer devices have been developed in the past to allow several operating transmitters and receivers to be connected to the same antenna while preventing undesired signals from one transmitter from reaching the receivers or other transmitters. Such multiplexers are available in several configurations, but typically they comprise a plurality of relatively narrow, highly selective bandpass filters. Each filter is respectively associated with an individual one of the transmitters or receivers, or with a frequency band in which several such devices may operate. Further, each filter is typically constructed to define a pass band which substantially excludes the passbands of the other filters.

Thus, in a "duplexer" for connecting a transmitter and a receiver to one antenna, a transmit filter is tuned to a first frequency range in which the transmitter operates, and a receive filter is tuned to a second frequency range in which the receiver operates. The receive filter is interposed between the receiver and the antenna, and the transmit filter is interposed between the transmitter and the antenna. Since the transmitter operates in a frequency range outside of the passband of the receive filter, the receive filter effectively rejects any RF energy produced by the transmitter at the intended transmitter frequency.

Because it is impossible to construct a "perfect" transmitter, transmitters often generate spurious signals at various frequencies, including the frequency on which the receiver operates. However, because the receiver operating frequency range is outside the passband of the transmit filter, such spurious signals are substantially attenuated. Thus, the transmit filter and receive filter cooperate to allow a transmitter and receiver to share a single antenna, while substantially preventing signals from the transmitter from reaching the receiver. Where more than two devices must be connected to the same antenna (or other load), the basic duplexer design has been extended by increasing the number of filters.

As noted above, multiplexers, and the filters from which they are built, have been constructed in a variety of configurations. In one configuration referred to as an "interdigital" filter, a cavity of rectangular cross section is formed, and a plurality of spaced adjacent resonating elements are provided, each alternate resonator extending inward from an opposite wall of the cavity. In such filters, the resonant frequency of each resonator is determined by its length, the impedance of each resonator is determined by its cross sectional size, and the amount of coupling with other resonators is determined by proximity to the other resonators.

In the past, multiplexers have been conventionally designed with filters as separate units. Thus, in FIG. 1, which depicts a radio system 108 employing one conventional multiplexer (duplexer) design, a transmitter 110 is connected to a transmit filter 112, and a receiver 114 is connected to a separate receive filter 116. The transmit and receive filters 112, 116 are connected in parallel through transmission lines 118, 120 at a "T" junction 122, and then via a transmission line 124 to an antenna 126. Typically, each filter is independently designed (i.e., in isolation) for optimal performance, and thus, the transmission lines and other interconnecting components are preferably designed such that when the filters are interconnected to operate as a multiplexer, each filter has little or no effect on the performance of the other filters. However, it is believed that some multiplexers have been developed in which multiple filters are connected in a "T" or star junction configuration and in which the filters have been optimized for operation only in the grouped configuration.

Figure 1:
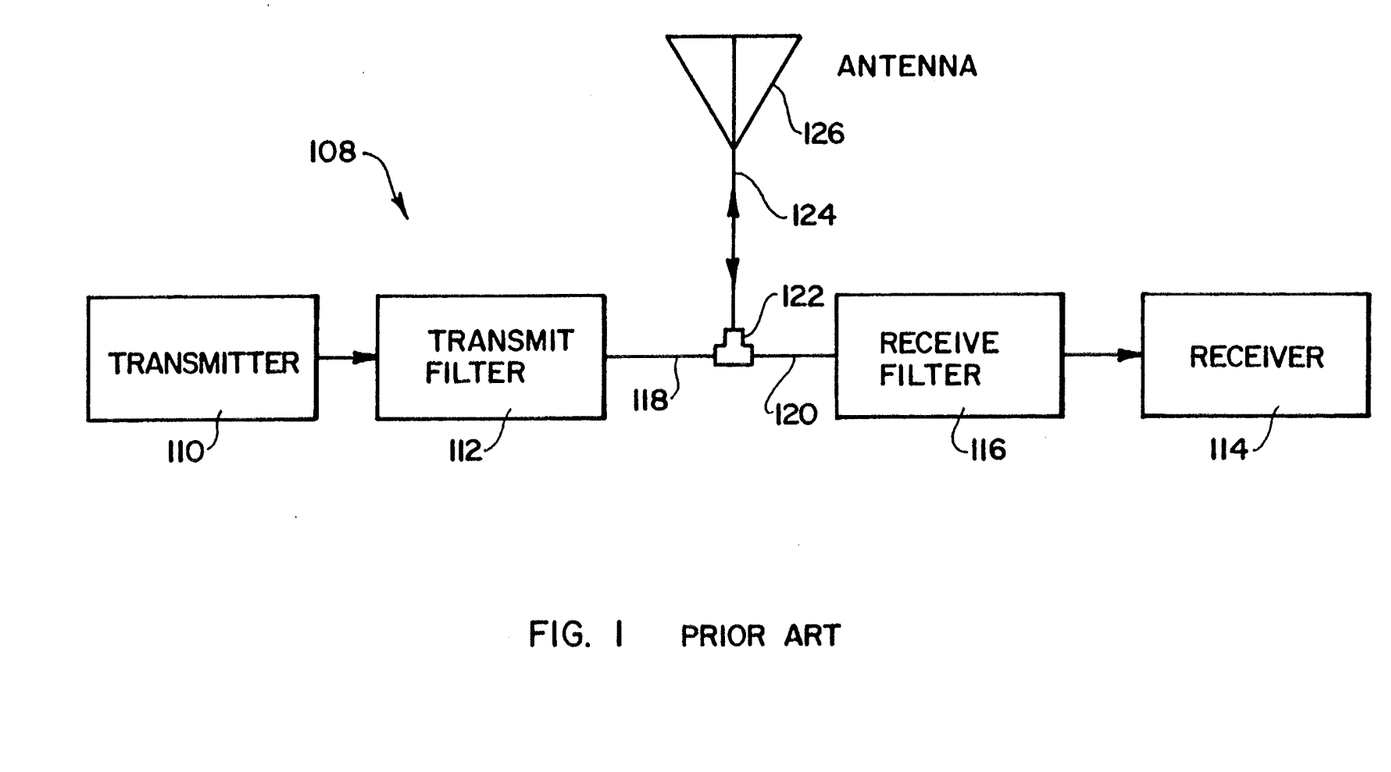
FIG. 1 is a block diagram of an antenna circuit of a radio communications system including a prior art multiplexer of conventional design.

Multiplexers of the design of FIG. 1 have several disadvantages. Providing separate filters, with separate filter enclosures and interconnections therebetween, increases the cost and space requirements of such multiplexers. In addition, these designs typically require that the transmission lines 118, 120 between the filters 112, 116 and the "T" junction 122 be cut to precisely defined lengths, often an even multiple of one-quarter wavelength at the filter center frequency. In some designs, the transmission lines may be intended to function as impedance transformers, or may be intended to isolate the individual filters. If the transmission lines are not manufactured to exactly the correct length, they may undesirably introduce reactance, or may undesirably transform the impedance of one filter as seen by the other filter. Thus, errors in the transmission line lengths can substantially degrade multiplexer performance. The transmission lines and associated connectors and other hardware are expensive, and the high expense and difficulty of manufacturing the transmission lines is exacerbated by the need to manufacture them to a precisely defined length. Further, the transmission lines take up valuable physical space in a radio system installation, and must be appropriately routed to avoid damage and to present a suitable appearance.

Figure 2:
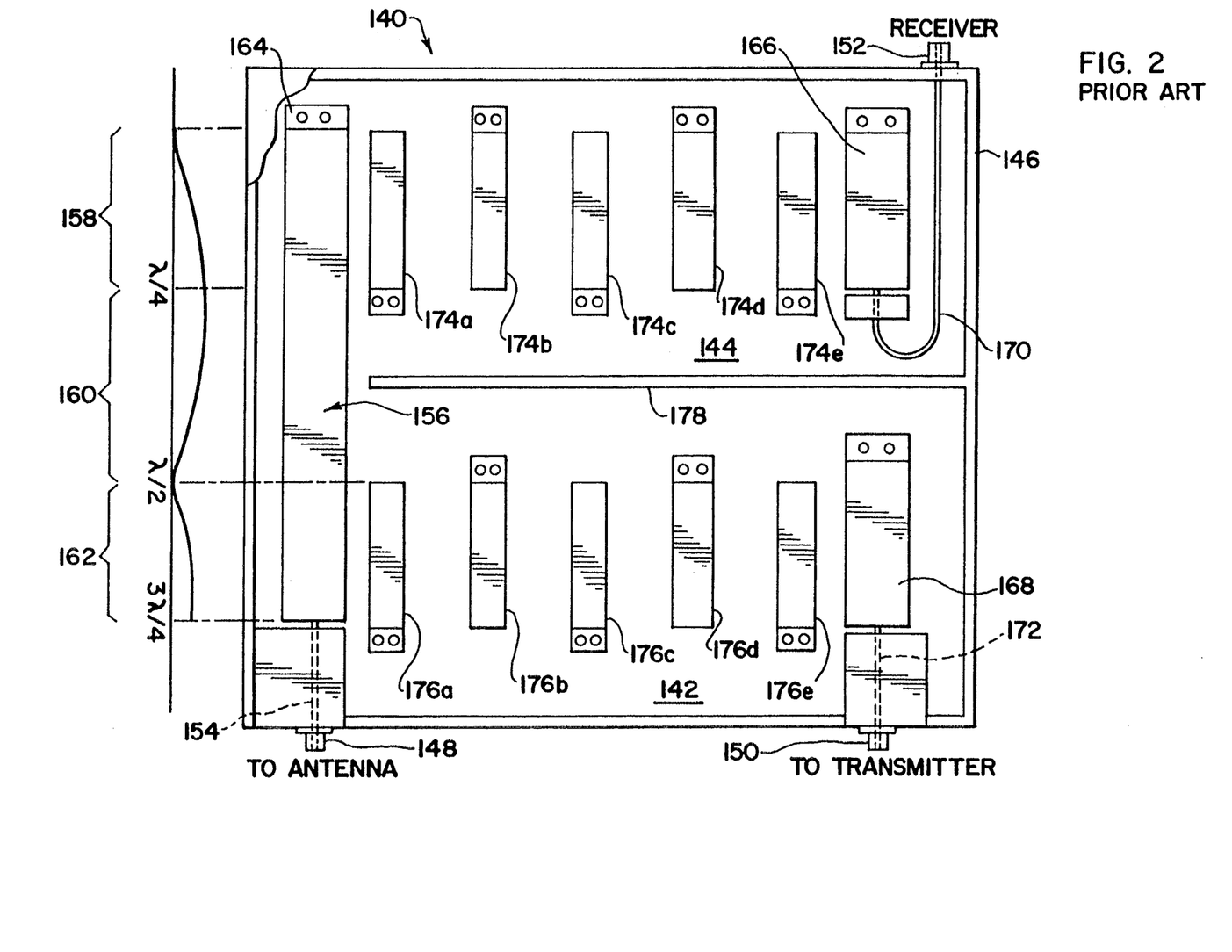
FIG. 2 is a plan view of a second prior art multiplexer.

In order to solve some of these problems, multiplexers having several interdigital filters integrated into a single package have been developed. U.S. Pat. Nos. 4,596,969, and 4,660,004, issued to Ronald Jachowski, disclose multiplexers in which two or more interdigital filters are disposed in an integrated package in a side-by-side adjacent relationship. A prior-art multiplexer 140 of this type is shown in FIG. 2 so that the differences between it and multiplexers constructed according to the present invention may be more clearly illustrated. The prior art multiplexer 140 comprises a box-like conductive housing 146 of substantially rectangular cross-section for containing a transmit filter 142 and a receive filter 144. A conductive dividing wall 178 separates the transmit filter 142 from the receive filter.

The receive filter includes a plurality of resonators 174a–174e, a receiver coupling transformer 166, a tap lead 170, and a receiver connector 152. The transmit filter includes a plurality of resonators 176a–176e, a transmitter coupling transformer 168, a tap lead 172, and a transmitter connector 150. Each of the resonators 174, 176, has one free end and one fixed end. The fixed end is mechanically and electrically connected (or "grounded") to the bottom housing wall of the filter.

An inter-filter transformer 156 is provided which extends along the length of the housing and which has portions adjacent each of the filters for coupling radio frequency (RF) energy between the respective filters and the antenna. The transformer 156 has a first end which is electrically connected to the conductive housing wall and a second end which is electrically connected to the antenna connector 148. According to the Jachowski '969 and '004 patents, the electrical lengths of the portions of the transformer 156 for coupling RF energy to each adjacent filter should be selected to be approximately one-quarter wavelength at the center frequency of the respective filter. Further, the locations of these coupling portions should be selected so that each coupling portion begins at a position which is an even multiple of one-quarter wavelength at the respective filter center frequency from the grounded end of the transformer.

Thus, as shown in FIG. 2, the coupling section 158 of transformer 156, which is associated with the receive filter, begins at the grounded end of the transformer and extends for one-quarter wavelength (at the receive filter center frequency $F_r$). The coupling section 162, which is associated with the transmit filter, begins at a position one-half wavelength from the grounded end of the transformer and extends for one-quarter wavelength (at the transmit filter center frequency $F_t$). A spacing portion 160 of the transformer 156 separates the receive filter coupling section 158 from the transmit filter coupling section 152. Although the exact length of this spacing portion 160 depends on the difference in center frequencies of the filters, in practice, the center frequencies are relatively close to one another, so that the spacing portion 160 is about one quarter wavelength long.

The transformer 156 of FIG. 2 thus functions in a manner similar to the transmission lines 118, 120 and "T" connection 122 of the multiplexer of FIG. 1.

The transformer 156 of FIG. 2 couples both filters to the antenna transmission line, provides a transformation between the impedance of the antenna transmission line and the impedance of the filters, and provides a desired phasing or electrical separation between the filters so that the filters do not substantially affect one another.

Figure 3:
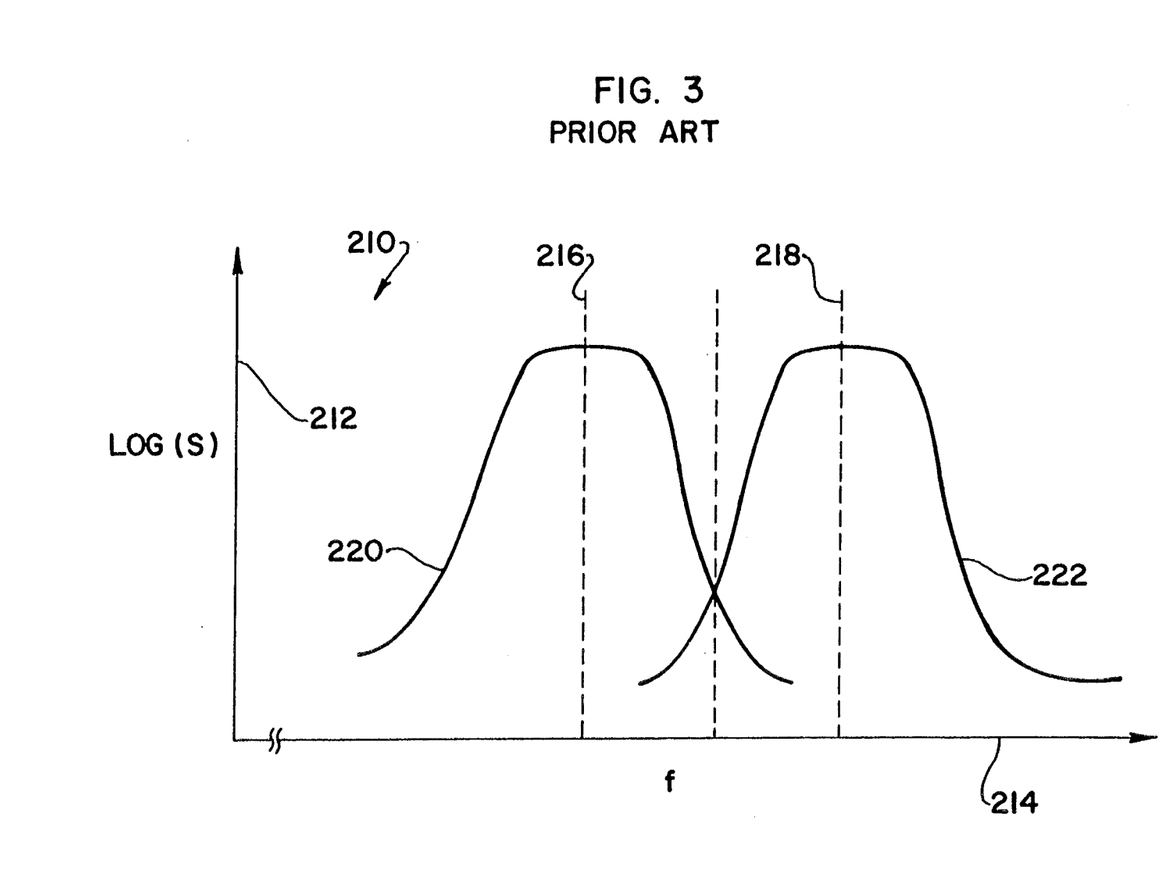
FIG. 3 is a graph showing the frequency response of the prior art multiplexer of FIG. 1.

As a result, each of the filters 142, 144 of FIG. 2 may be designed essentially independently, without concern that the electrical characteristics of one filter will modify the performance of the other filter when combined in an integrated assembly. See, for example, FIG. 3, which depicts in a stylized graph 210 the response of the filters over a range of frequencies. The abscissa 214 represents frequency; the ordinate 212 represents a response function proportional to the logarithm of signal strength. Curve 220 represents the response function of the receive filter over a range of frequencies about the receive filter center frequency $F_r$ 216. Curve 222 represents the response function of the transmit filter over a range of frequencies about the transmit filter center frequency $F_t$ 218. If a transformer is provided as taught in the Jachowski '969 and '004 patents, each filter's response curve remains substantially the same whether the filter is operated alone or in conjunction with the other filter.

Because of the high density of modern communications systems, such as cellular telephone systems, radio equipment for such systems must often be located at non-traditional sites in which space for such equipment may be extremely limited. Further, the manufacturers of radio equipment are under constant pressure from customers to reduce the size, weight, and cost of equipment. Accordingly, it is highly desirable to minimize both the amount of material required for housings and the physical space requirement of all equipment, including multiplexers.

Although multiplexers constructed according to the Jachowski '969 and '004 patents are believed to perform well, the requirement that the filter coupling portions of the transformer, and the associated filters themselves, be spaced approximately one quarter wavelength apart along the transformer makes it difficult to design highly space efficient multiplexers. Although it is desirable to have a certain amount of clearance between the filter resonators and the conductive cavity walls, the quarter wavelength separation required between filters according to the Jachowski '969 and '004 patents far exceeds the ideal clearance. Thus, in a duplexer of that design, as much as one-quarter to one-third of the physical volume may be considered excess.

An additional problem with conventional multiplexers is that certain prior art methods of adjusting the frequency of the resonators used therein have tended to produce a source of intermodulation. In many prior-art resonators, a frequency adjustment screw is provided, and its use produces intermodulation. Further, existing interdigital filter resonators use conventional metal forming techniques, and although their lengths can be adjusted during manufacturing, they generally do not include provision for adjustment of their length once manufacturing is complete. Typical resonators are plated with a highly-conductive coating prior to installation in a filter. Thus, metal forming techniques which require substantial deformation or removal of material are inappropriate because such techniques would damage the conductive coating.

SUMMARY OF THE INVENTION

It is therefore an object of the present invention to provide an antenna circuit multiplexer including a plurality of integrated filters constructed in a highly space-efficient manner.

It is a further object of the invention to provide an provide an antenna circuit multiplexer including a plurality of interdigital filters coupled to an antenna coupling transformer and in which the filters may be spaced more closely together than has been possible in previous designs.

It is another object of the invention to provide an antenna circuit multiplexer having a plurality of interdigital filters integrated adjacently in a housing, in which the filters are so electrically coupled that adjacent filters may be spaced from one another by less than one-quarter electrical wavelength.

It is a further object of the invention to provide an antenna circuit multiplexer having a plurality of interdigital filters coupled to a single antenna coupling transformer, in which a portion of each filter for coupling to the transformer is spaced from the coupling portion of another filter by a distance of no more than about one-eighth wavelength.

It is another object of the invention to provide a resonator for use in an interdigital filter having a resonant frequency which is conveniently adjustable in a manner which is less susceptible to acting as a source of intermodulation even after the resonator is installed in the filter.

A multiplexer according to the present invention comprises a housing, a transformer section within the housing extending in a first direction, and at least two interdigital filters adjacently disposed within the housing along the first direction. The transformer section has a first end electrically coupled to an antenna circuit connector, and a second end electrically coupled to the housing (i.e. grounded). Each filter includes several resonating elements. At least one resonating element of each filter is located in proximity with a portion of the transformer such that electrical coupling between the filter and the transformer is established. The length of each coupling portion of the transformer is always at least as long as the associated resonators and is approximately one-quarter electrical wavelength at the center frequency of the associated filter, or less depending on the nature of the filter.

The dimensions of the filter cavities are preferably selected to be as small as possible without unacceptably degrading the filter insertion loss. Further, the filters, and the associated coupling portions of the transformer, are disposed in close proximity. For example, the filter cavity size and spacing may be selected such that the transformer coupling portions of adjacent filters are only ⅛ wavelength or less apart (measured along the first direction).

This provides a significant reduction in the physical volume required for prior art multiplexers employing interdigital filters. In such prior art multiplexers, the coupling portion for each filter was preferably located at a position aligned with an even multiple of one-quarter wavelength at the filter resonant frequency, which resulted in inter-filter spacings of approximately one-quarter wavelength.

A resonating element for use in the inventive multiplexer is formed as a longitudinally extending body portion. The body portion may have a cylindrical or any other appropriate cross section. One end of the resonator is adapted for mounting to a structural wall of the filter. For example, the resonator may have a suitable hole for receiving and capturing a mating fastener. The free end of the resonator has an adjustment member which may be physically deformed to modify the length, and thereby, the resonant frequency, of the resonator. The adjustment member is a planar leaf supported in a position longitudinally displaced a short distance from the free end of the resonator. The adjustment leaf may be formed by cutting a transverse notch into the body portion near the free end. The leaf is preferably thin enough that it may be conveniently deformed by applying mechanical force using a conventional tool. Since no material need be added or removed when adjusting the resonator, the resonator is well suited to applications in which a highly conductive coating is applied to the resonator and the multiplexer must be tuned in a subsequent manufacturing stage.

BRIEF DESCRIPTION OF THE DRAWINGS

These and other features of this invention will be best understood by reference to the following detailed description of a preferred embodiment of the invention, taken in conjunction with the accompanying drawings, in which.

DETAILED DESCRIPTION OF THE PREFERRED EMBODIMENTS

Figure 4:
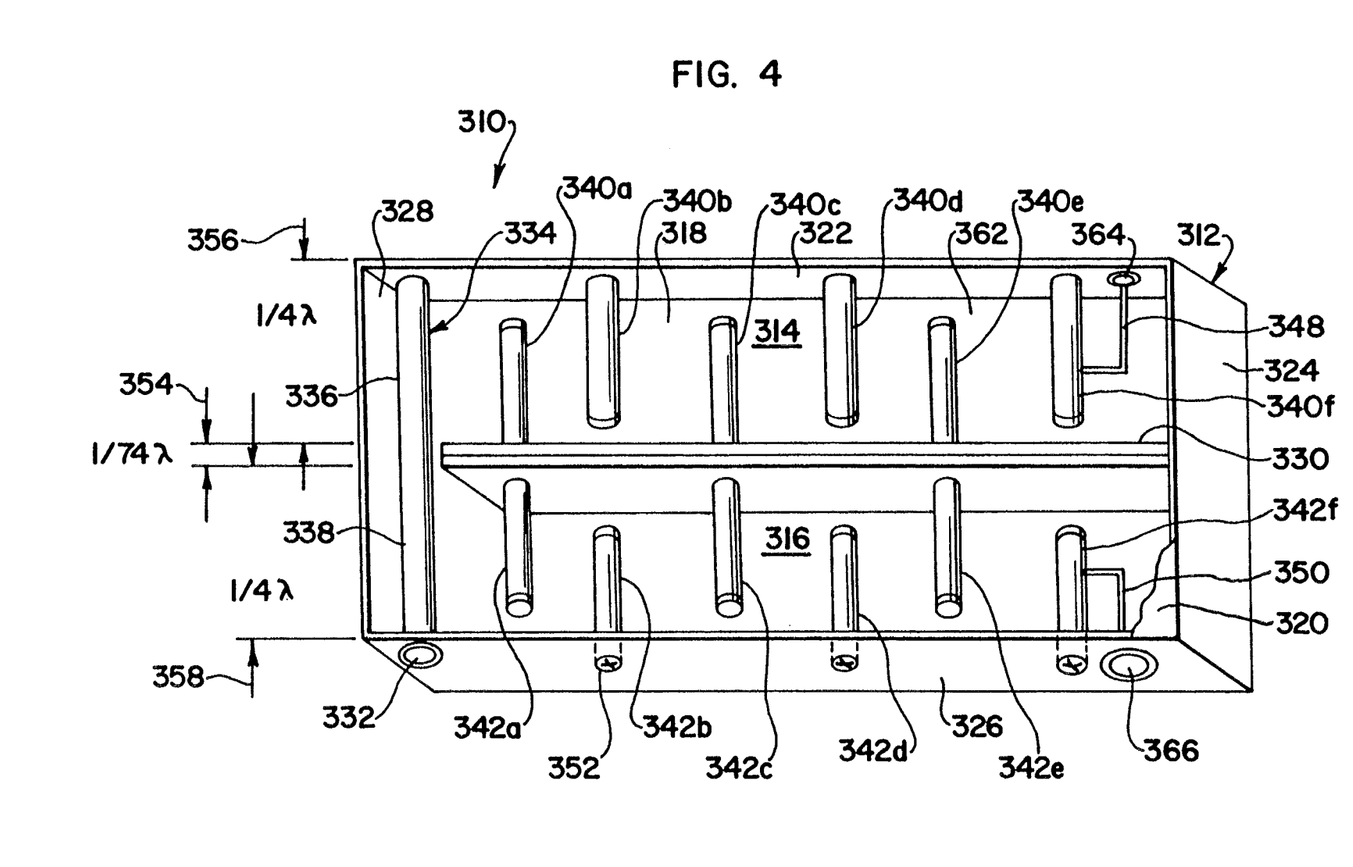
FIG. 4 is a simplified top perspective view of a first embodiment 310 of a multiplexer constructed according to the present invention, in which the multiplexer is implemented as a duplexer.
Figure 5:
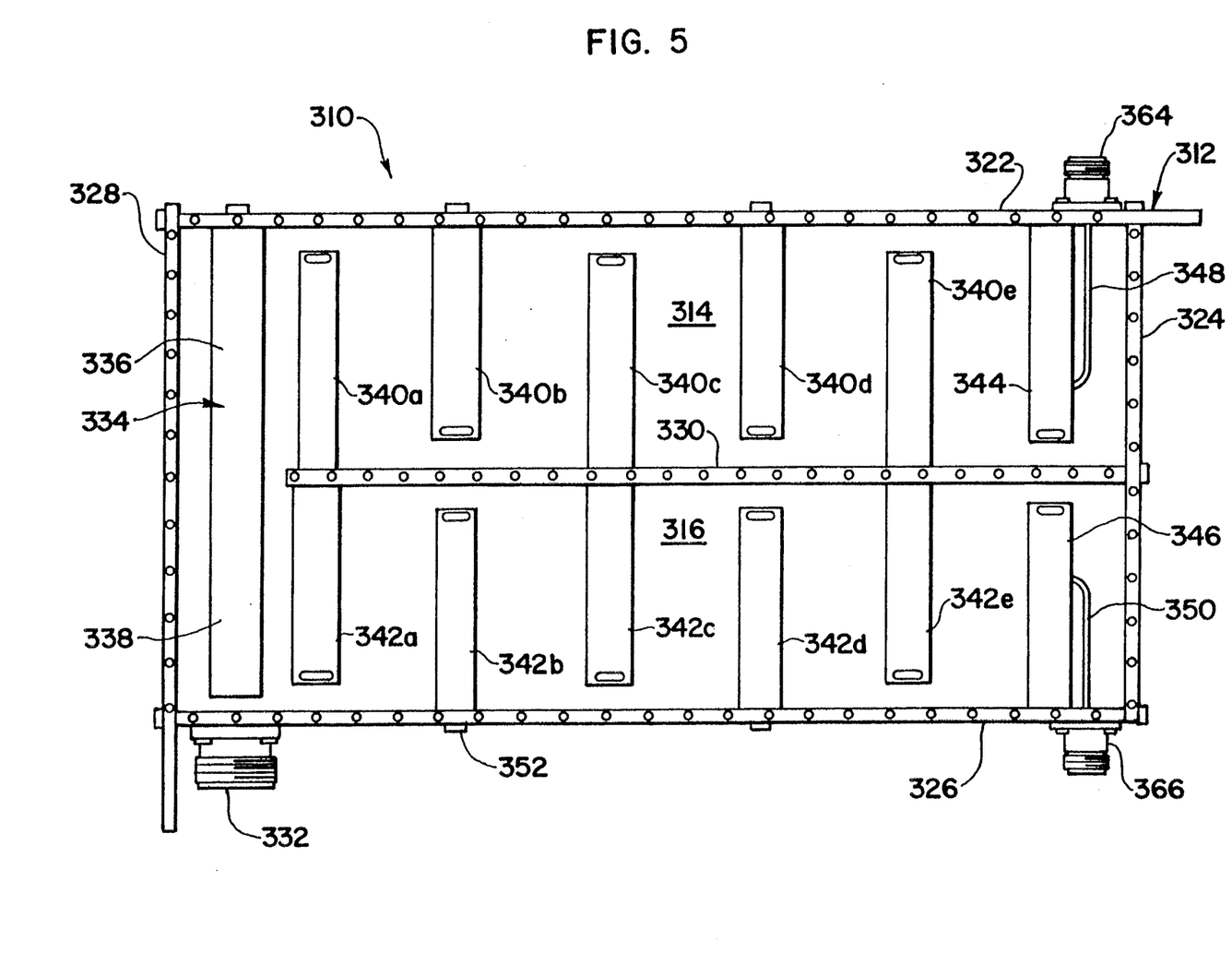
FIG. 5 is a top plan view of the duplexer 310 of FIG. 4.

A first preferred embodiment 310 of a multiplexer constructed according to the present invention is shown in FIGS. 4–5. The multiplexer 310 is arranged in a duplexer configuration having a receive filter 314 operating at a frequency band of 824–849 MHz and a transmit filter 316 operating at a frequency band of 869–894 MHz. However, the assignment of a particular one of the filters for connection to a transmitter and the other filter for connection to a receiver is a function of the desired use to which the multiplexer is put and the frequency ranges to which the filters are tuned. The filters are equally suitable for connection to a receiver or transmitter (or another suitable RF device) operating in the appropriate frequency range. Further, it will be appreciated that the present invention is not restricted to multiplexers adapted for connection to a single transmitter and a single receiver. For example, the invention could be employed to provide a multiplexer for connecting two transmitters to a single antenna. In addition, the invention may be applied to multiplexers in which having any reasonable number of filters. Additional embodiments, including a three-filter multiplexer, are discussed further.

The multiplexer 310 comprises a housing 312 having a rear wall 322, a right side wall 324, a front wall 326, a left side wall 328, a bottom cover 362, and a top cover 320 (FIG. 4, shown cut away for clarity). The walls forming the housing are preferably constructed of a conductive material (as of copper) or a structural material suitable for plating with a conductive material. The walls are preferably coated with a material having excellent electrical conductivity, such as silver.

As noted above, the interior walls of the housing, the central wall, the resonators, and the transformer section of the multiplexer are preferably coated with a material having excellent electrical conductivity. For example, these components may be plated with a 0.0003–0.0005 inch layer of silver according to federal silver plate specification QQ-S-365D, Type II, Grade A. The coating helps minimize electrical losses within the filter, thereby improving the insertion loss performance of the filter. In addition, the coating helps prevent formation of non-linearly-conducting joints and other structures, which contribute to intermodulation. Thus, the coating also improves the intermodulation performance of the filter.

Multiplexer 310 further comprises a connector 332 provided in the front wall 326 of the housing near the left side wall 328. When the multiplexer 310 is used in a duplexer application, the connector 332 provides the port through which the multiplexer 310 may be connected to an antenna transmission line; in other applications, the connector 332 could be connected to apparatus other than antennas or associated transmission lines. A filter coupling transmission line transformer 334 extends parallel to, and in close proximity to the left side wall 328 from the antenna circuit connector 332 to the rear wall 322. The transformer 334 is electrically connected (i.e., grounded) to the rear wall 322, and is electrically connected to the center conductor of connector 332 (see FIG. 14).

As best seen in FIGS. 4 and 5, a central wall 330 extends parallel to the front and rear walls 326, 322 from the right-hand side wall 324 to divide the volume within the housing into a receive filter portion 314 and a transmit filter portion 316. The receive filter portion 314 comprises a plurality of transmission line resonator elements 340a–340f (collectively referenced as 340). RF energy is coupled between the coupling transformer section 334 and the resonator elements 340. Those resonator elements which are closest to the transformer 334 (such as 340a and 340b) have the greatest effect on this coupling. The receive filter resonators 340 are approximately one quarter wavelength long at the center frequency of the receive filter. That portion 336 of transformer 334 immediately adjacent the receive filter resonators 340 is largely responsible for the coupling between the transformer and the receive filter 314. The receive filter coupling portion 336 has an electrical length 356 which is approximately one quarter wavelength.

Similarly, the transmit filter portion 316 comprises a plurality of transmission line resonator elements 342a–342f (collectively referenced as 342). RF energy is coupled between the coupling transformer section 334 and the resonator elements 342. Those resonator elements which are closest to the transformer 334 (such as 342a and 342b) have the greatest effect on this coupling. The transmit filter resonators 342 are approximately one quarter wavelength long at the center frequency of the transmit filter. That portion 338 of transformer 334 adjacent the transmit filter resonators 342 is largely responsible for the coupling between the transformer and the transmit filter 314. The transmit filter coupling portion 338 has a length 358 which is approximately one quarter wavelength.

Each of the filters 314 and 316 has a port for connection to an external device. Receive filter 314 has a connector 364 through which the filter 314 may be electrically coupled to a receiver. Transmit filter 316 has a connector 366 though which the filter 316 may be connected electrically to a transmitter. Where the multiplexer is used to provide in an application other than a duplexer, these connectors could be used to couple the filters to any other suitable devices.

Figure 12:
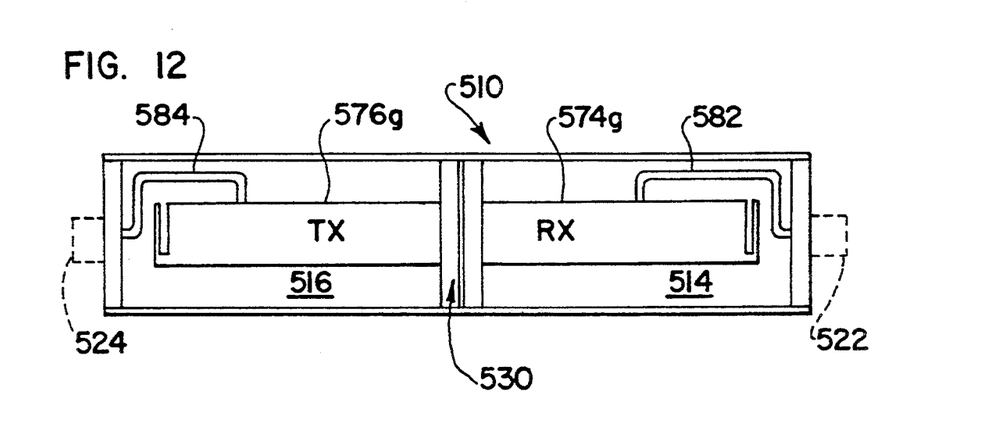
FIG. 12 is a side cross section view through the duplexer 510 of FIG. 7, taken along the view lines 12—12 thereof.

Any suitable method may be used to couple the filter to the center conductor of the connector. For example, as best seen in FIGS. 4, 5, and 12, in each filter, a tap conductor may be connected from the connector center conductor to one of the filter resonators at an appropriate location along its length. Typically, one of the resonators located furthest from the coupling transformer 334 is used for coupling the filter to the connector. In receive filter 314, tap conductor 348 connects the center conductor of receive filter connector 364 to resonator 340f. In transmit filter 316, tap conductor 350 connects the center conductor of transmit filter connector 366 to resonator 342f. The impedance of each filter as viewed by an external device at the connector is largely a function of the location the along the length of the tapped resonator at which the tap conductor is connected. Accordingly, for each filter, the tap location is preferably selected to appropriately match the impedance of the device which is to be connected to that filter.

Any suitable structure may be used to provide resonators 340, 342 for use in the multiplexer 310 of the present invention. One preferred resonator structure for use in the inventive multiplexer 310 is formed as a conductive rod having a substantially circular cross section. A preferred embodiment of such a resonator, having a structure which allows the resonant frequency of the resonator to be conveniently adjusted after the resonator has been manufactured and installed into a multiplexer is discussed further in detail in connection with FIGS. 9–12.

As is known in the art, resonators in interdigital filters typically have a first fixed end which is mechanically attached, and electrically connected (grounded), to one of the conductive surfaces which define the boundaries of the filter, and a second free or unconnected end. In some prior-art interdigital filters, the fixed ends of the resonators are attached to a top or bottom housing surface of the filter. However, this structure requires that the working portion of the resonator be longitudinally spaced from the cavity wall to allow the mounting portion of resonator to be secured to the housing surface. This undesirably increases the size of each filter in the longitudinal direction of the resonators.

In the inventive multiplexer 310, the resonators may be mechanically attached and electrically connected to the housing 312 of the multiplexer using any appropriate method. However, according to the present invention, in order to minimize the size of the multiplexer 310, each resonator is preferably directly mechanically attached and electrically connected (grounded) to one of the front or rear housing walls 322, 326, or to the central dividing wall 330. Accordingly, no intervening space is required between the working portion of each resonator and wall to which it is attached. This structure advantageously reduces the size of each filter in the longitudinal direction of the resonators. Some clearance is required between the free end of each resonator and the opposing wall, but such clearance would be required in any interdigital filter design. The resonators are preferably attached to the walls 322, 326, 330 at a location approximately half-way between the upper and lower covers 320, 362.

In addition to serving as a portion of the multiplexer enclosure, the front and rear housing walls 326 and 322, and the central dividing wall 330 also provide a support for the resonators 340, 342. Preferably, the walls are sufficiently sturdy that the resonator may be fastened directly to the wall. Any suitable method which provides a good electrical connection and mechanical attachment may be used to secure the resonator to the wall. The base of the resonator may have a threaded opening or recess for receiving a suitable fastener. The fastener may be constructed as an integral part of the wall, or may be a separate piece which extends through an aperture in the wall.

Preferably, the central dividing wall 330, and any fasteners 352 used to secure the resonators thereto, are constructed to minimize the thickness of the wall yet maintains the strength characteristics so that the wall will not deform when the resonators are adjusted. Since the position of each resonator along the wall 330 is determined by various electrical performance requirements for the respective filters, it is possible that resonators must be provided in approximately the same position on both sides of the wall 330. To avoid mechanical interference problems caused by this positional coincidence, the central dividing wall 330 may be constructed as a pair of adjacent conductive plate members. A small space may be provided between the plate members to accommodate portions of the resonator fasteners, such as screw heads, or the like, which must extend through the plate members, but this space is preferably minimized.

As best seen in FIGS. 4–5, the receive and transmit filters 314 and 316 are immediately adjacent one another, and very little extra space is provided between the free end of each filter resonator 340, 342 and the opposing housing wall or central wall. As a result, the receive and transmit filter coupling portions 336, 338 of transformer 334 are located almost immediately adjacent one another along the length of the transformer.

As best seen in FIG. 4, the distance 354 between coupling portions 336, 338 of the transformer is primarily limited by the thickness of the central wall 330 which forms the boundary between the filter cavities 314, 316, and which separates certain of the resonators 340, 342. Thus, not only are the transformer coupling portions 336, and 338 nearly adjacent in the longitudinal direction, but the resonators of each filter which couple to the transformer (e.g. 340a and 342a) are also nearly adjacent in the longitudinal direction. In this embodiment, the filter spacing is about one-seventyfourth of a wavelength in the longitudinal direction.

Measured in the longitudinal direction, the transformer coupling portions 336, 338 may be separated by a small distance, compared to an electrical wavelength at the center frequency of each transformer.

In a multiplexer design in accordance with the present invention, the coupling portions are separated by no more than about one-eighth of a wavelength. Similarly, the coupling resonators 340a and 342a may be separated by an equivalently small distance, such as by no more than about one-eighth of a wavelength in the longitudinal direction. Thus, a multiplexer 310 constructed according to the present invention may be substantially shortened in the longitudinal direction, compared to prior art multiplexers having several interdigital filters, each separated by about one-quarter wavelength.

It is believed that in prior-art multiplexers, in which a plurality of integrated interdigital filters were coupled by a transformer section, and where the filters were located at spaced serial positions along the transformer and separated by approximately one-quarter wavelength, the filter spacing effectively isolated or decoupled the filters from one another. Thus, designers of prior-art multiplexers having widely spaced filters were able to design and optimize each filter essentially independently, and could subsequently combine the filters in a multiplexer assembly because the interaction between a particular filter and the other filter or filters was small.

In the inventive multiplexer 310, in which minimal spacing is allowed between adjacent filters (or filter coupling portions), there is significant interaction between the filters. The filters cannot be designed and optimized independently, because when combined, each filter affects the electrical characteristics of the other filters. According to the present invention, the inventive multiplexer is preferably designed and optimized as an integrated assembly, so that the design of each filter takes into account the effects of other filters and of the coupling transformer 334. Commercially available computer software packages may be used to design and optimize the multiplexer in this manner. For example, the Touchstone software product, which is a commercial product of EEsof, Inc. of Westlake Village, Calif. may be used.

In prior-art multiplexers employing serially-adjacent interdigital filters and a single coupling transformer, each filter was generally designed to exhibit excellent performance individually, and when integrated into the multiplexer assembly. Because the filters of the inventive multiplexer are preferably designed as a group, the performance of the filter depends on the presence of the other filters and certain other multiplexer components. Accordingly, in contrast to prior-art designs, it is likely that for many multiplexer designs, any particular filter, if considered in isolation, would not exhibit acceptable filter performance characteristics. Nevertheless, multiplexers as described herein produce excellent characteristics very similar to those shown by FIG. 3.

Figure 6:
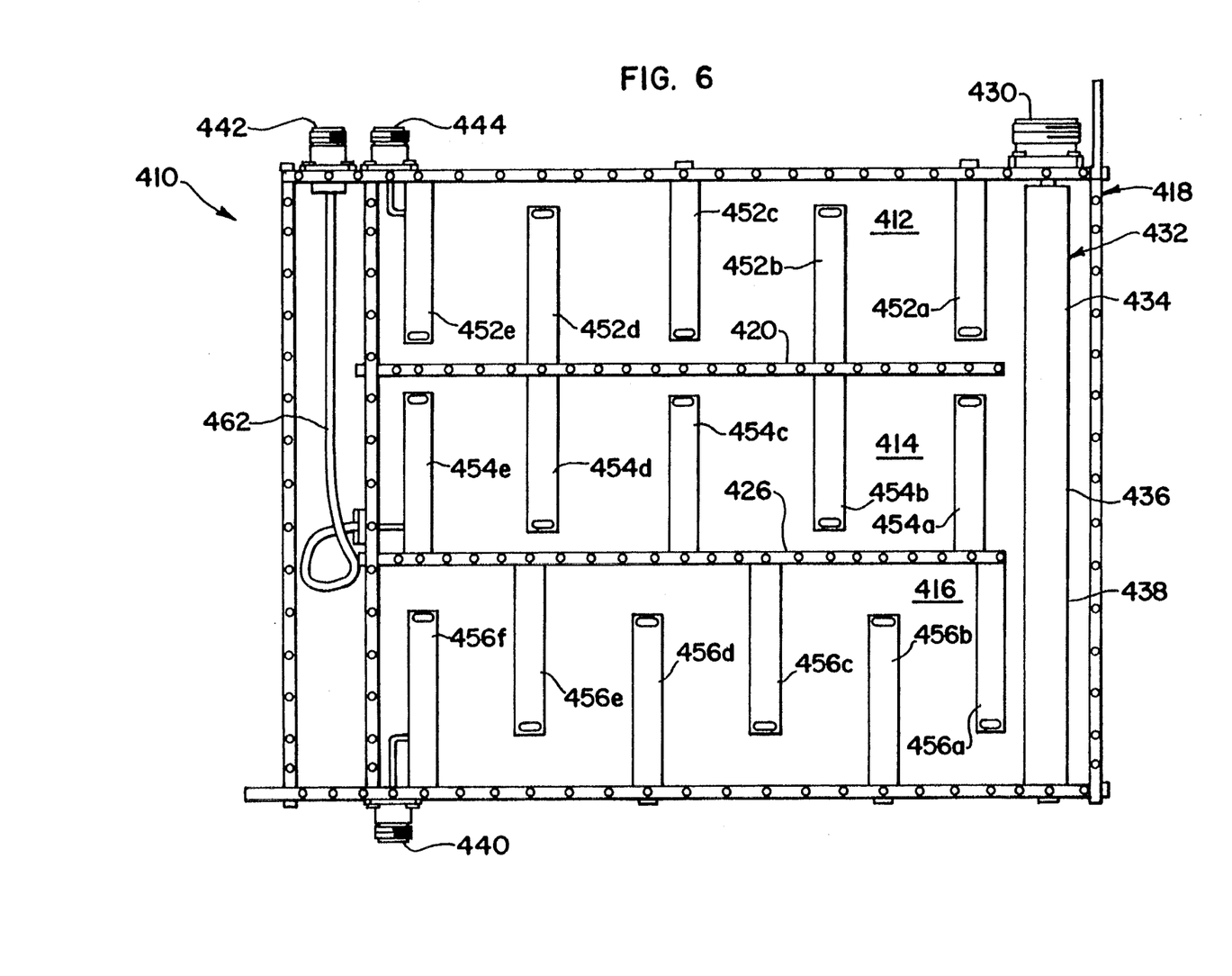
FIG. 6 is a top plan view of a second embodiment 410 of a multiplexer constructed according to the present invention, in which the multiplexer is implemented as a triplexer.

A second preferred embodiment 410 of a multiplexer constructed according to the present invention is shown in FIG. 6. This embodiment is generally similar to the first embodiment 310, but is constructed with three transmission line filters instead of two. The multiplexer 410 has a housing 418 integrating a first transmit filter 412 operating at 915–925 MHz, a second transmit filter 414 operating at 939.5–950 MHz, and a receive filter 416 operating at 880–905 MHz. A single antenna circuit connector 430 is connected to a coupling transformer section 432 which serves each of the filters 412, 414, and 416. The first transmit filter 412 and the second transmit filter 414 are separated by a first dividing wall 420. The second transmit filter 414 and the receive filter 416 are separated by a second dividing wall 426.

The first transmit filter 412 includes a plurality of resonators 452a–452e. The resonators (e.g. 452a) closest to the coupling transformer 432 function to couple the first transmit filter 412 to the coupling transformer. The portion 434 of the coupling transformer 432 which is immediately adjacent the closest resonator 452a may be considered a coupling portion for the first transmit filter 412. The resonator 452e located farthest from the coupling transformer is used to couple the first transmit filter 412 to an external device. A tap conductor is electrically connected to the resonator at a suitable position thereon and connects the resonator to the center conductor of a first transmitter connector 444.

Similarly, the second transmit filter 414 includes a plurality of resonators 454a–454e. The resonators (e.g. 454a) closest to the coupling transformer 432 function to couple the second transmit filter 414 to the coupling transformer. The portion 436 of the coupling transformer 432 which is immediately adjacent the closest resonator 454a may be considered a coupling portion for the second transmit filter 414. The resonator 454e located farthest from the coupling transformer is used to couple the second transmit filter 414 to an external device. A tap conductor is electrically connected to the resonator at a suitable position thereon and connects the resonator to the center conductor of a second transmitter connector 442. The tapped resonator 452e is not positioned near an external wall of the multiplexer on which the second transmitter connector 442 may be located. Accordingly, the connector 442 is provided on a remote external wall, and a suitable transmission line 462, which may be a length of conventional coaxial cable, is used to connect the tap conductor to the connector 442.

The receive filter 416 includes a plurality of resonators 456a–456f. The sixth resonator 456f, for which there is no counterpart in the transmit filters 412, 414, provides additional selectivity in the receive filter. The resonators (e.g. 456a) closest to the coupling transformer 432 function to couple the receive filter 416 to the coupling transformer. The portion 438 of the coupling transformer 432 which is immediately adjacent the closest resonator 456a may be considered a coupling portion for the receive filter 416. The resonator 454f located farthest from the coupling transformer is used to couple the receive filter 416 to an external device. A tap conductor is electrically connected to the resonator at a suitable position thereon and connects the resonator to the center conductor of a receiver connector 440.

As best seen in FIG. 6, filters 412, 414, and 416 are positioned in a serially adjacent manner in the longitudinal direction of the coupling transformer. Each filter is immediately adjacent its neighboring filter or filters, and very little extra space is provided between the free end of each filter resonator 452, 454, 456, and the opposing housing wall or central wall. As a result, the filter coupling portions 434, 436, and 438 of transformer 432 are located almost immediately adjacent one another along the length of the transformer. The distance between adjacent coupling portions 432, 434, 436 of the transformer is primarily limited by the thickness of the dividing walls 420, 426 which form the boundary between the filters and which separate certain of the resonators 452, 454, 456. Thus, not only are the transformer coupling portions 432, 434, 436 nearly adjacent in the longitudinal direction, but the resonators of each filter which couple to the transformer (e.g. 452a, 454a, 456a) are also nearly adjacent in the longitudinal direction.

Measured in the longitudinal direction, the transformer coupling portions 432, 434, 436 may be separated by a small distance, compared to an electrical wavelength at the center frequency of each transformer. For example, in the multiplexer design of FIG. 6, the coupling portions are separated by the thickness of the wall, namely about one-seventyfourth of a wavelength. Similarly, the coupling resonators 452a, 454a, and 456a may be separated by an equivalently small distance, such as about one-seventyfourth of a wavelength in the longitudinal direction. Thus, a multiplexer 410 constructed according to the present invention may be substantially shortened in the longitudinal direction, compared to prior art multiplexers having several interdigital filters, each separated by about one-quarter wavelength.

Although embodiments having two and three filters have been disclosed herein, it will be appreciated that the invention could be applied to a multiplexer having any reasonable number of filters. For a multiplexer having N serially arranged filters, the invention advantageously reduces the size of the multiplexer in the longitudinal direction to approximately $N/(2N-1)$ times the size of an equivalent multiplexer of conventional design.

Figure 7:
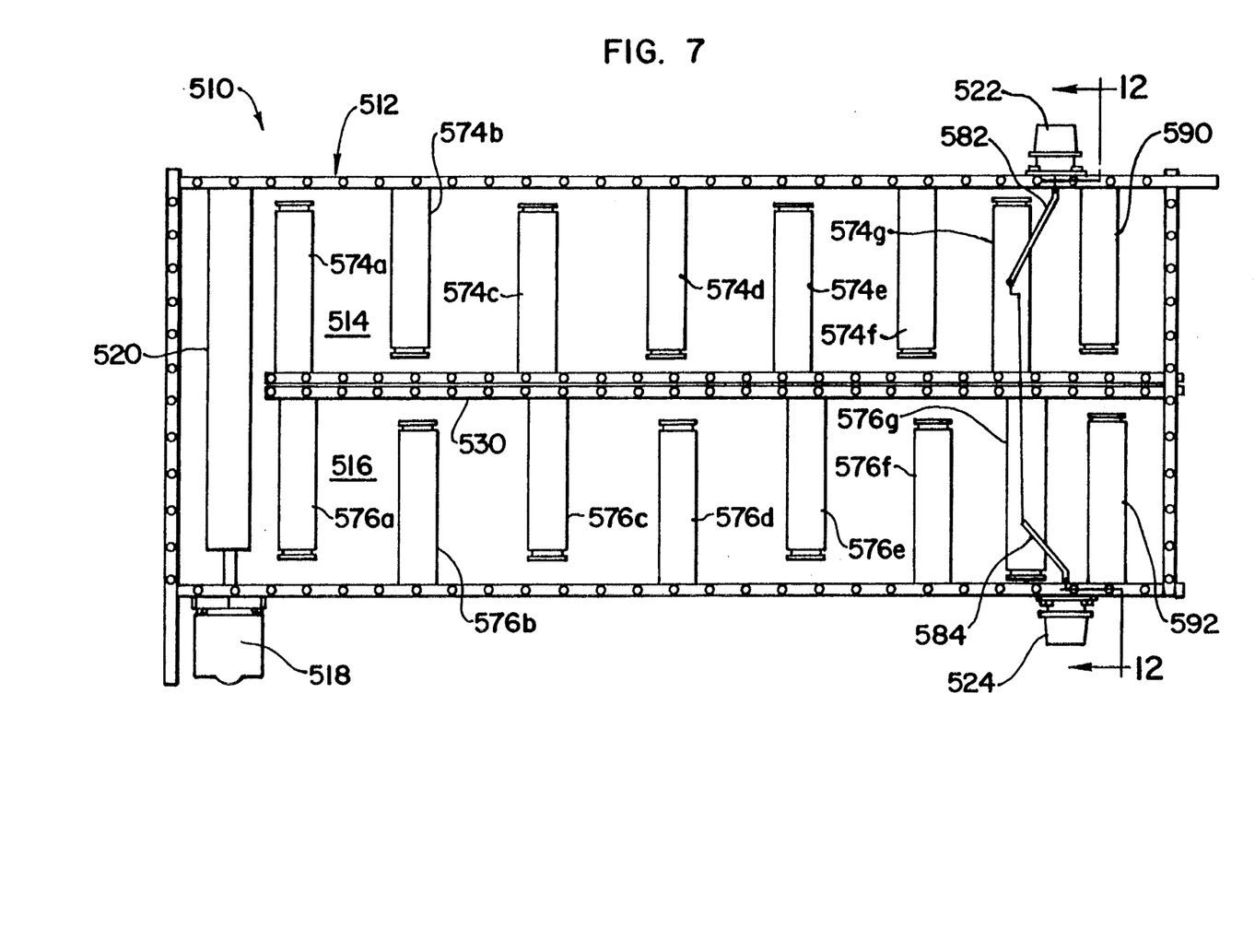
FIG. 7 is a top plan view of a third embodiment 510 of a multiplexer constructed according to the present invention, in which the multiplexer is implemented as a duplexer including notch resonator elements.
Figure 8:
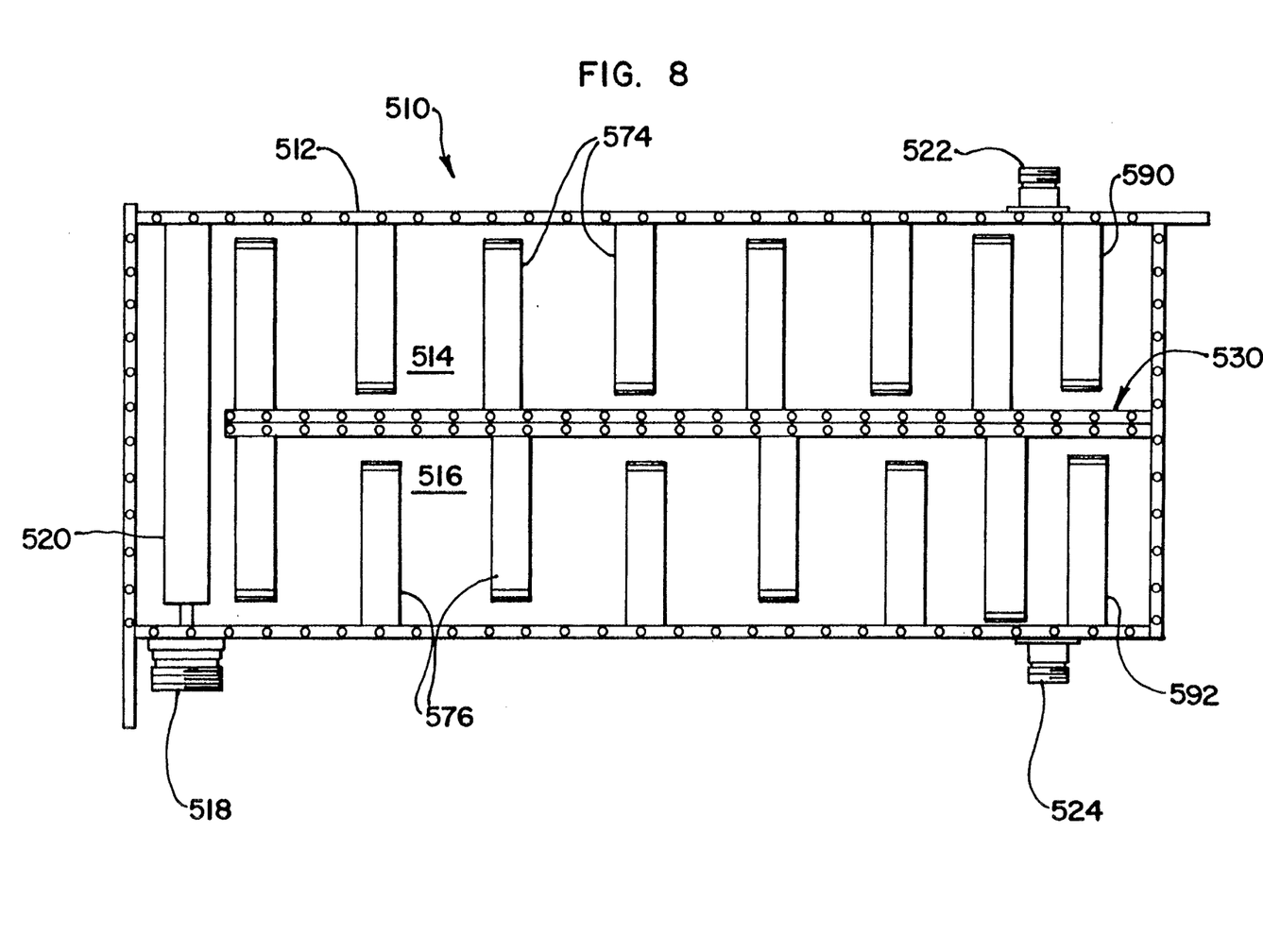
FIG. 8 is a second top plan view of the duplexer of FIG. 7, showing preferred dimensions of a specific implementation of the duplexer.

A third preferred embodiment 510 of a multiplexer constructed according to the present invention is shown in FIGS. 7, 8, and 12. FIG. 8 is equivalent to FIG. 7, but includes certain exemplary component dimensions suitable for use in implementing a multiplexer having a receive filter operating at 874–905 MHz and a transmit filter operating at 919–950 MHz. This embodiment is generally similar to the first embodiment 310, but each transmission line filter includes an additional "notch" resonator to improve its selectivity.

Multiplexer 510 has a housing 512, a receive filter 514, and a transmit filter 516. An antenna circuit connector 518 is electrically coupled to a single coupling transformer section 520 which serves the receive and transmit filters 514, 516. The filters are separated by a dividing wall 530 which spaces the filter sections by an electrical distance equal to about one-thirtyseventh of a wavelength.

The receive filter 514 has a plurality of resonators 574a–574g, which are arranged and function in a manner similar to the resonators of multiplexer 310. Similarly, the transmit filter 516 has a plurality of resonators 576a–576g. However, receive and transmit filters 514, 516 each have an additional "notch" resonator 590, 592 respectively. Each of the notch resonators 590, 592 are tuned and coupled to produce a sharp notch in the frequency response of the respective filter at a predefined frequency near the passband of the other filter. This notch renders each filter more selective by better rejecting signals in the passband of the other filter.

FIG. 12 is a partial cross-section view through the multiplexer 510 of FIGS. 7–8 depicting the connection of tap conductors between a resonator of each filter and a connector for electrically coupling the filter to an external device. Typically, one of the resonators (e.g. 574g, 576g) located farthest from the coupling transformer 520 is used for coupling the filter to the connector. In receive filter 514, tap conductor 582 connects the center conductor of receive filter connector 522 to resonator 574g. In transmit filter 516, tap conductor 584 connects the center conductor of transmit filter connector 524 to resonator 576g. The impedance of each filter as viewed by an external device at the connector is largely a function of the location the along the length of the tapped resonator at which the tap conductor is connected. Accordingly, for each filter, the tap location is preferably selected to appropriately match the impedance of the device which is to be connected to that filter. FIGS. 8 and 12 include dimensions in inches useful in constructing an exemplary multiplexer 510.

Multiplexer 510 shares the space conserving advantages of multiplexer 310 discussed earlier.

Figure 9:
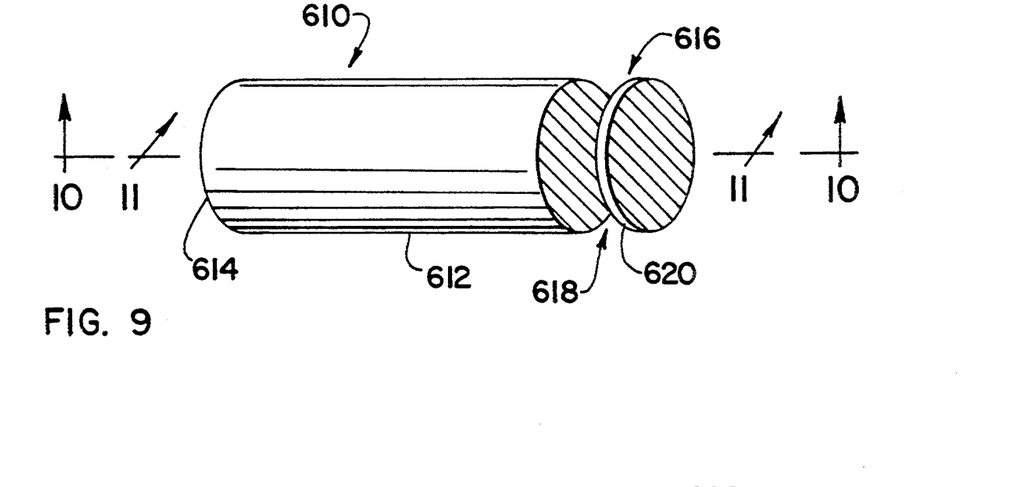
FIG. 9 is a top perspective view of an adjustable resonating element for use in the multiplexers of FIGS. 4–8.
Figure 10:
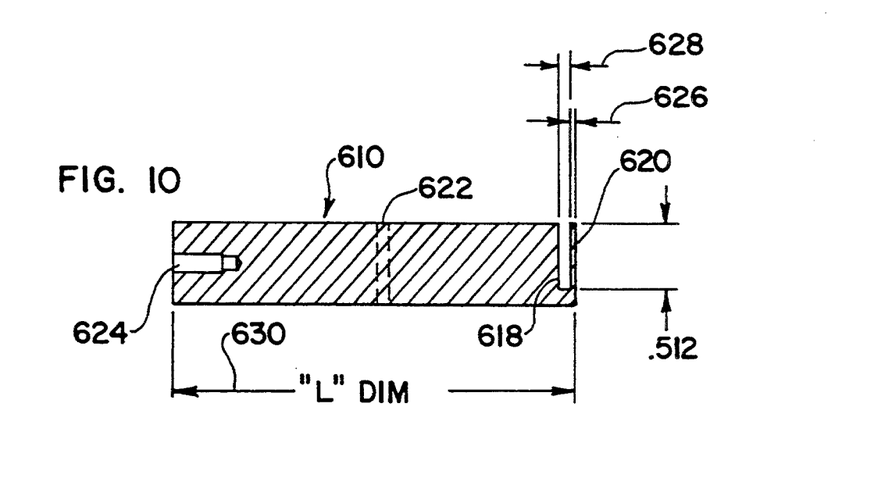
FIG. 10 is a side cross section view of the resonator of FIG. 9 taken along the view lines 10—10 thereof.
Figure 11:
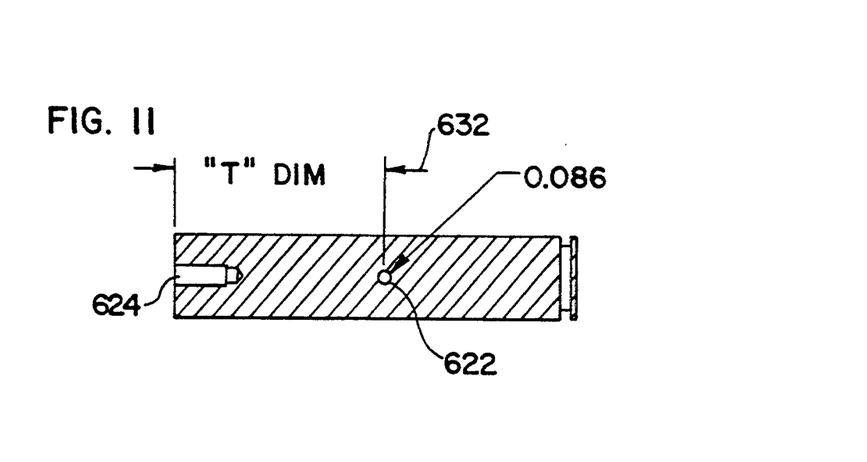
FIG. 11 is a top cross section view of the resonator of FIG. 9 taken along the view lines 11—11 thereof.

According to another aspect of the present invention, an adjustable resonator element 610 is provided to allow convenient tuning of the filters of multiplexers 310, 410, and 510. As best seen in FIGS. 9–11, the resonator 610 is preferably formed as a longitudinally extending member having a circular cross section. However, any other suitable cross sectional shape could also be used. Resonator 610 may be constructed from any highly conductive material, such as copper, and may be formed using any suitable metal forming method, such as extrusion, casting, machining, or the like. The resonator 610 preferably has a uniform surface finish. For best performance, the resonator 610 may preferably be coated with a material having even lower resistivity than the substrate material. For example, resonator 610 may be provided with a plated coating of silver or another highly conductive material, thereby minimizing losses and non-linear electrical behavior. Non-linear electrical behavior degrades performance by increasing intermodulation.

The resonator 610 may be formed as a longitudinally extending body portion 612 having a cylindrical or any other appropriate cross section. One end 614 of the resonator 610 is adapted for mounting to a structural wall of the filter. Preferably, the resonator includes suitable means 624 for receiving a fastener for mounting the resonator to the supporting surface. For example, the fastener receiving means 624 may be a threaded recess for receiving and capturing a mating screw or bolt. An additional recess 622 may be provided to receive a tap wire used to couple a signal to or from the resonator. See also FIG. 12.

The free end 616 of the resonator 610 is preferably provided with an adjustment member 620 which may be physically deformed to modify the length, and thereby, the resonant frequency, of the resonator 610. The adjustment member 620 is preferably formed as a substantially planar leaf which is electrically and mechanically secured to the body 612 of the resonator. Preferably, the adjustment member 620 supported in a position longitudinally displaced a short distance from the free end of the resonator. The adjustment leaf 620 may be formed by any suitable method. For example, where the resonator is formed from bar stock, a transverse notch 618 may be cut a substantial distance into the body portion 612 of the resonator 610 near the free end 616. The adjustment leaf 620 is preferably thin enough that it may be conveniently deformed by applying mechanical force using a conventional tool, such as a screwdriver.

Because no material must be added or removed when adjusting the resonator, the resonator is well suited to applications in which the frequency adjustment procedure must occur after the resonator has been manufactured and installed into a filter. In some filter applications, a highly conductive coating is applied to the resonator and supporting structures after assembly but before frequency adjustment is complete. Removal of material after the coating has been applied would damage the coating.

Figure 13:
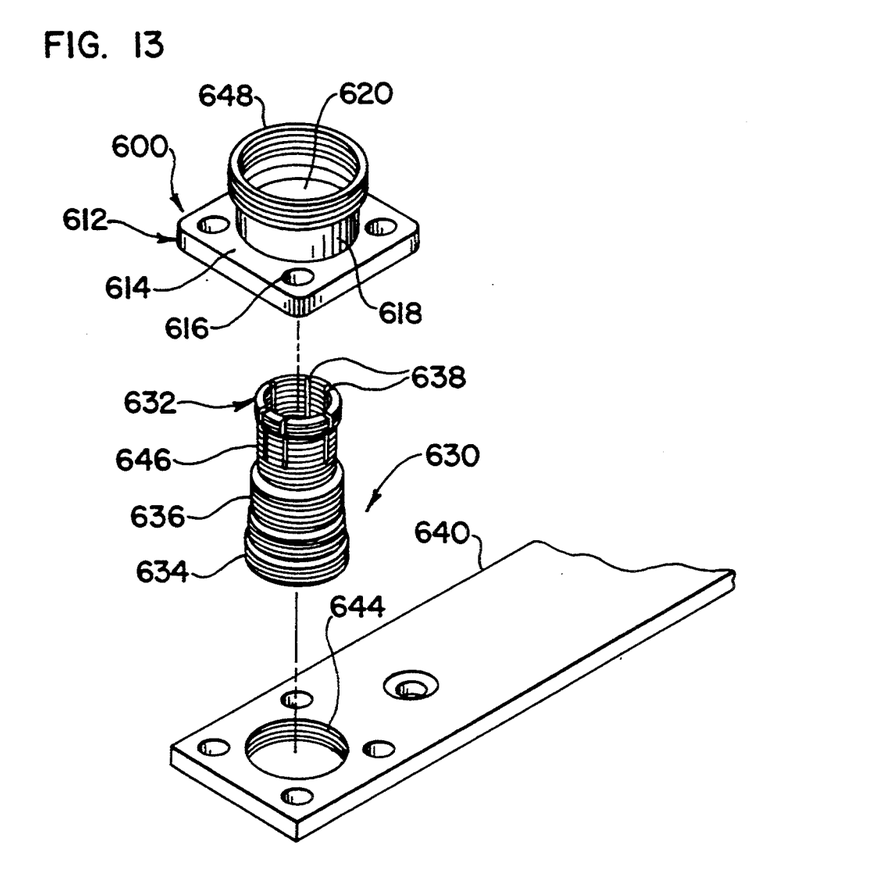
FIG. 13 is an exploded side perspective view of a connector for use in the inventive multiplexers of FIGS. 4–8.
Figure 14:
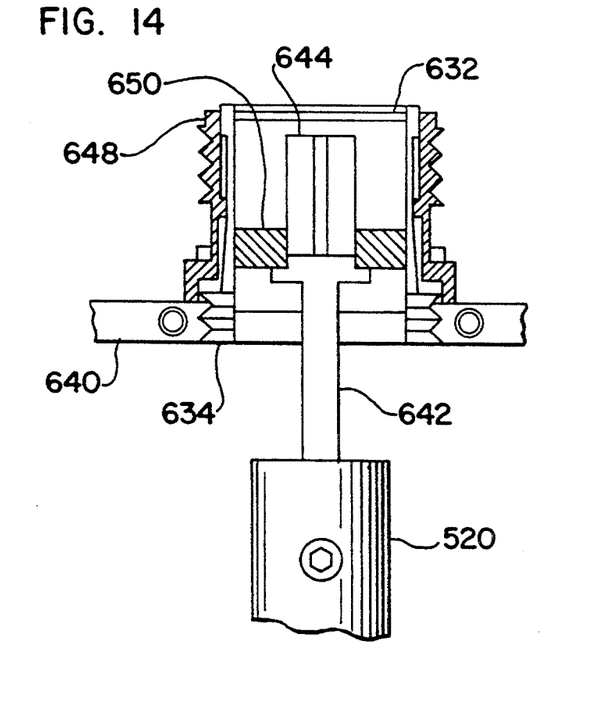
FIG. 14 is a top cross section view of the connector of FIG. 13, taken along the view lines 14—14 of FIG. 15.
Figure 15:
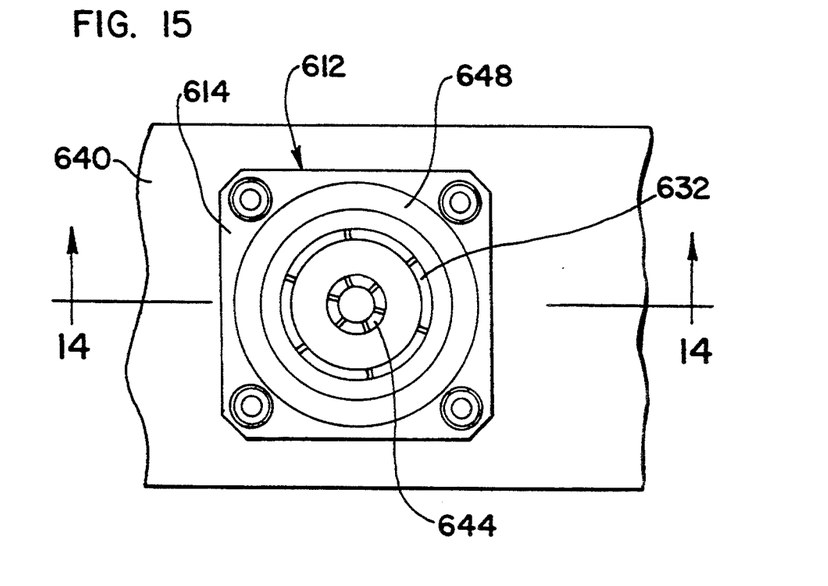
FIG. 15 is a top plan view of the connector of FIG. 13.

According to another aspect of the invention, a radio-frequency connector 600 having improved intermodulation performance is provided. FIGS. 13–15 depict a suitable connector 600 which may be used as the antenna circuit connectors 332, 430, and 518 of multiplexers 310, 410, and 510 respectively. The connector 600 comprises an outer protective cowl 612, an inner body portion 630, and a center conductor 644. The cowl comprises a planar base mounting member 614 and a cylindrical body 618 extending transverse to the base. The base member 614 has an aperture which coincides with the interior cavity 620 of the body 618. The base member 614 preferably includes additional apertures 616 exterior to the body 618 for mounting the base member 614 to a supporting structure 640. The cowl 612 is preferably constructed of a sturdy, electrically conductive material. Exterior threads 648 are provided to secure a mating connector (not shown) in a desired mechanical position.

The inner body portion 630 of the connector 600 is generally cylindrical. A base portion 634 of enlarged diameter is used to mechanically attached and electrically connect the inner body 630 to a supporting structure 640. The base portion 634 preferably has exterior threads or other suitable means to mate with an aperture 644 in the supporting structure. A portion 636 of gradually reduced diameter extends upward from the base portion 634. An upper coupling section 646 extends upward from portion 636. An upper lip 634 of increased diameter is provided on the coupling section 646. A plurality of thin slots are provided in the coupling section 646.

A center conductor 642 is mounted in the inner cavity of the body portion 630. The center conductor 642 is typically connected to the coupling transformer of the multiplexer (e.g. coupling transformer 520 of multiplexer 510). However, one skilled in the art will appreciate that the connector 610 may be advantageously employed in other applications. A ring-shaped dielectric insulator 650 is provided to locate the center conductor 642 in a desired position within the body portion 630. The center conductor preferably includes a cylindrical upper section 644 for receiving the center conductor of a mating connector (not shown).

The above-described embodiments of the invention are merely examples of ways in which the invention may be carried out. For example, transmission line filters other than interdigital filters may be employed in the practice of this invention. Such other filters include combline filters and coaxial resonator filters. Other ways to carry out the invention may also be possible, and are within the scope of the following claims defining the invention.

What is claimed is:

1. An antenna circuit multiplexer comprising:
   a housing;
   first, second, and third connection ports;
   transformer means disposed within said housing and extending in a first direction therein;
   first and second filter means adjacently disposed within said housing along said transformer means;
   said first filter means being electrically coupled to said first connection port;
   said second filter means being electrically coupled to said second connection port;
   said transformer means being electrically coupled to said third connection port;
   said first and second filter means each having means for electrically coupling to said transformer means;
   said first filter means being tuned to a first predetermined frequency corresponding to a first electrical wavelength;
   said second filter means being tuned to a second predetermined frequency corresponding to a second electrical wavelength;
   said means for electrically coupling said first filter means to said transformer means being separated from said means for electrically coupling said second filter means to said transformer means by a distance no more than approximately one eighth of said wavelengths as measured along said first direction.

2. The multiplexer of claim 1 wherein said first connected port is electrically coupled to a receiver, said second connection port is electrically coupled to a transmitter, and said third connection port is electrically coupled to an antenna.

3. An antenna circuit multiplexer comprising:
   a housing;
   an antenna circuit connection port;
   transformer means disposed within said housing and extending in a first direction therein;
   said transformer means being electrically connected to said antenna circuit connection port;
   a plurality of filter means adjacently disposed within said housing along said transformer means;
   a plurality of device connection ports, each of said ports being respectively electrically coupled to one of said filter means;
   each of said plurality of filter means each having means for electrically coupling to said transformer means;
   at least one of said filter means being tuned to a predetermined frequency corresponding to an electrical wavelength;
   said means for electrically coupling each of said plurality of filter means to said transformer means being separated from said means for electrically coupling at least one other of said plurality of filter means to said transformer means by a distance smaller than one eighth of said wavelength as measured along said first direction.

4. The multiplexer of claim 3 having two filters.

5. The multiplexer of claim 3 having three filters.

6. The multiplexer of claim 3 wherein at least one of said filter means is an interdigital filter.

7. The multiplexer of claim 3 wherein at least one of said filter means comprises a plurality of spaced resonating elements.

8. The multiplexer of claim 7 wherein each of said resonating elements extends in a direction substantially parallel to said first direction.

9. The multiplexer of claim 3 wherein at least one of said filters includes an adjustable frequency resonating element comprising:
   an elongate body portion extending in a first direction and having first and second ends;
   and an adjustment member mechanically and electrically attached to said body portion at said first end thereof;
   said second end being adapted for mechanical and electrical attachment to a support member of the filter;
   said adjustment member being supported proximate to said body portion in a position displaced along said first direction;
   said adjustment member being deformable by application of mechanical force to modify the effective electrical length of said resonating element.

10. An adjustable frequency resonating element for use in a filter having a support member, said element comprising:
    an elongate body portion extending in a first direction and having first and second ends;
    and an adjustment member mechanically and electrically attached to said body portion at said first end thereof;
    said second end being adapted for mechanical and electrical attachment to a support member of the filter;
    said adjustment member being supported proximate to said body portion in a position displaced along said first direction;
    said adjustment member being deformable by application of mechanical force to modify the effective electrical length of said resonating element.

11. The adjustable frequency resonating element of claim 10 wherein said adjustment member is formed as a leaf member having a cross section substantially the same as the cross section of said body portion.

12. The adjustable frequency resonating element of claim 10 wherein said adjustment member is constructed as an integral part of said body portion by forming a substantially planar notch adjacent said first end of the body portion, said notch extending partially through said body portion in a direction transverse to said first direction.

13. The adjustable frequency resonating element of claim 10 having a circular cross section.

* * * * *